US010352627B2

(12) United States Patent
Yuoka et al.

(10) Patent No.: US 10,352,627 B2
(45) Date of Patent: Jul. 16, 2019

(54) NUCLEATION DEVICE, HEAT STORAGE DEVICE, AND NUCLEATION METHOD FOR HEAT STORAGE MATERIAL

(71) Applicant: KITAGAWA INDUSTRIES CO., LTD., Aichi (JP)

(72) Inventors: Teruaki Yuoka, Kasugai (JP); Jian Guang Li, Kasugai (JP); Hiroto Yoshino, Kasugai (JP)

(73) Assignee: KITAGAWA INDUSTRIES CO., LTD., Aichi (JP)

(*) Notice: Subject to any disclaimer, the term of this patent is extended or adjusted under 35 U.S.C. 154(b) by 0 days.

(21) Appl. No.: 15/854,922

(22) Filed: Dec. 27, 2017

(65) Prior Publication Data
US 2018/0180361 A1   Jun. 28, 2018

(30) Foreign Application Priority Data
Dec. 28, 2016 (JP) .................. 2016-255778

(51) Int. Cl.
F28D 15/00 (2006.01)
F28D 20/02 (2006.01)

(52) U.S. Cl.
CPC .......... *F28D 20/028* (2013.01); *Y02E 60/145* (2013.01)

(58) Field of Classification Search
CPC . F28D 20/028; Y02E 60/145; H01L 23/3672; H01L 29/7787; H01L 21/02505; B01D 9/005; B01D 2009/0086

USPC ..................................... 165/104.21
See application file for complete search history.

(56) References Cited

U.S. PATENT DOCUMENTS

| 4,532,110 A | 7/1985 | Kapralis et al. |
| 2009/0021918 A1* | 1/2009 | Fang .................. H01L 23/3672 361/720 |

FOREIGN PATENT DOCUMENTS

| JP | 60-251189 | 12/1985 |
| JP | 63-105219 | 5/1988 |
| JP | WO2016059981 | * 4/2016 |

* cited by examiner

*Primary Examiner* — Davis D Hwu
(74) *Attorney, Agent, or Firm* — Wenderoth, Lind & Ponack, L.L.P.

(57) ABSTRACT

A nucleation device for causing phase change in a heat storage material from a liquid state to a solid state, the nucleation device including:
an elastic member including a plurality of annular portions with a ring shape wound in substantially close contact with one another, the elastic member being elastically displaceable such that adjacent pairs of the plurality of annular portions in substantially close contact with one another separate from one another; wherein
the heat storage material is caused to phase change by the elastic member elastically displacing while disposed in the heat storage material.

15 Claims, 10 Drawing Sheets

NUCLEATION DEVICE, HEAT STORAGE DEVICE, AND NUCLEATION METHOD FOR HEAT STORAGE MATERIAL

CROSS-REFERENCE TO RELATED APPLICATIONS

This application claims the benefit of Japanese Unexamined Patent Application Publication No. 2016-255778A filed Dec. 28, 2016 in the Japan Patent Office, and the entire disclosure of Japanese Patent Application No. 2016-255778 is incorporated herein by reference.

BACKGROUND

The technology described in the present specification relates to a nucleation device, a heat storage device, and a nucleation method for a heat storage material.

In the related art, Japanese Unexamined Patent Application Publication No. S60-251189A describes a heat storage device in which solidification heat released when a heat storage material phase changes from a liquid to a solid is used as a heat source. This heat storage device includes heat storage material that releases heat when phase changing from a liquid state to a solid state, a metal strip that serves as a trigger for nucleation that promotes the phase change of the heat storage material, and a container that houses the heat storage material and the strip. When using the heat storage material as a heat source, the heat storage material is impacted by pinching the container from the outside by fingers and snap displacing the strip. Upon the snap displacing, the heat storage material is nucleated and the heat storage material phase changes from a liquid to a solid, thereby releasing the solidification heat of the heat storage material.

Also in the related art, Japanese Unexamined Patent Application Publication No. S63-105219A describes another heat storage device. In this heat storage device, a heat storage material is housed in a heating container and an activator is housed in an insulating container. By controlling an on/off valve provided between the heating container and the insulating container, the heat storage material and the activator can be brought into contact to induce nucleation. By the heat storage material phase changing from a liquid to a solid, solidification heat is released.

SUMMARY

However, the heat storage device described in Japanese Unexamined Patent Application Publication No. S60-251189A has low nucleation reliability when used repeatedly. Additionally, the heat storage device of Japanese Unexamined Patent Application Publication No. S63-105219A requires the heat storage material and the activator to be housed in separate containers and the on/off valve to be controlled. As a result, the heat storage device is complicated and large.

In the present specification, technology for improving the nucleation reliability of a heat storage material with a simple configuration is described.

A nucleation device described in the present specification is a nucleation device for causing phase change in a heat storage material from a liquid state to a solid state, the nucleation device including:

an elastic member including a plurality of annular portions with a ring shape wound in substantially close contact with one another, the elastic member being elastically displaceable such that adjacent pairs of the plurality of annular portions in substantially close contact with one another separate from one another; wherein the heat storage material is caused to phase change by the elastic member elastically displacing while disposed in the heat storage material.

Herein, "substantially close contact" refers to a state in which adjacent annular portions are in a certain state of close contact, yet allows for vital material for the nucleation to be present between the adjacent annular portions when viewed microscopically.

A heat storage device described in the present specification includes a heat storage material that phase changes from a liquid state to a solid state;

the nucleation device described above; and a container that houses the heat storage material and the nucleation device.

A nucleation method for a heat storage material described in the present specification is a method including:

disposing an elastic member in a heat storage material, the elastic member including a plurality of annular portions with a ring shape and being elastically displaceable such that the plurality of annular portions in substantially close contact with one another separate from one another;

elastically displacing the elastic member causing nucleation of the heat storage material.

The present inventors observed how nucleation occurs when vital material for nucleation under substantially close contact conditions are brought into contact with a heat storage material. Based on this idea, tests were conducted on various members to see whether nucleation would occur.

The present inventors found that by elastically displacing an elastic member with a plurality of annular portions in substantially close contact with one another, the vital material for nucleation under substantially close contact conditions is brought into contact with the heat storage material, and the heat storage material phase changes from a liquid state to a solid state. Such a nucleation device can freely cause phase change in the heat storage material, can increase nucleation reliability of the heat storage material with a simple configuration, and can reliably release solidification heat of the heat storage material.

In an embodiment of the nucleation device and heat storage device described in the present specification, the elastic member may be a helical extension spring including a spring body that includes the plurality of annular portions continuous in a spiral manner.

According to such a configuration, a helical extension spring can be used as the elastic member to nucleate the heat storage material. In other words, the nucleation device can have a configuration not requiring a novel elastic member.

In an embodiment of the nucleation device and heat storage device described in the present specification, the helical extension spring may have a spring constant of 0.8 or greater.

According to such a configuration, the pressure under close contact conditions between the annular portions can be increased, and the vital material under substantially close contact conditions can be made more likely to remain. As a result, the nucleation reliability can be increased compared to a configuration in which the spring constant is less than 0.8 and the pressure under close contact conditions between the annular portions is reduced.

An embodiment of the heat storage device described in the present specification may have a configuration wherein the elastic member including a spring body that includes the plurality of annular portions continuous in a spiral manner and a pair of gripping portions with a hook-like shape provided on both end portions of the spring body; and that further includes a fixed portion fixed such that one gripping portion of the pair of gripping portions does not move;

a moveable portion moveable between an initial position and a final position while holding the other gripping portion of the pair of gripping portions, upon the moveable portion moving from the initial position to the final position, the elastic member being displaced from a state of not being elastically displaced to a state of being elastically displaced; and a drive unit that presses and moves the moveable portion from the initial position to the final position.

According to such a configuration, by driving the drive unit from a remote location, the spring body of the elastic member can be elastically displaced, and the substantially close contact conditions between the annular portions can be changed, and the heat storage material can be nucleated. As a result, even when in a remote location, the nucleation reliability of the heat storage material can be increased, and solidification heat of the heat storage material can be reliably released.

According to the technology described in the present specification, the nucleation reliability of a heat storage material can be increased with a simple configuration.

DESCRIPTION OF EMBODIMENTS

First Embodiment

A first embodiment according to the technology disclosed in the present specification will be described while referencing FIGS. 1 to 7.

The present embodiment illustrates an example of a heat storage device 10 that uses solidification heat, released when heat storage material 11 phase changes from a liquid to a solid, as a heat source. Note that in the description below, "up-down direction" is based on the up-down direction in FIGS. 1 and 5.

Figure 1:
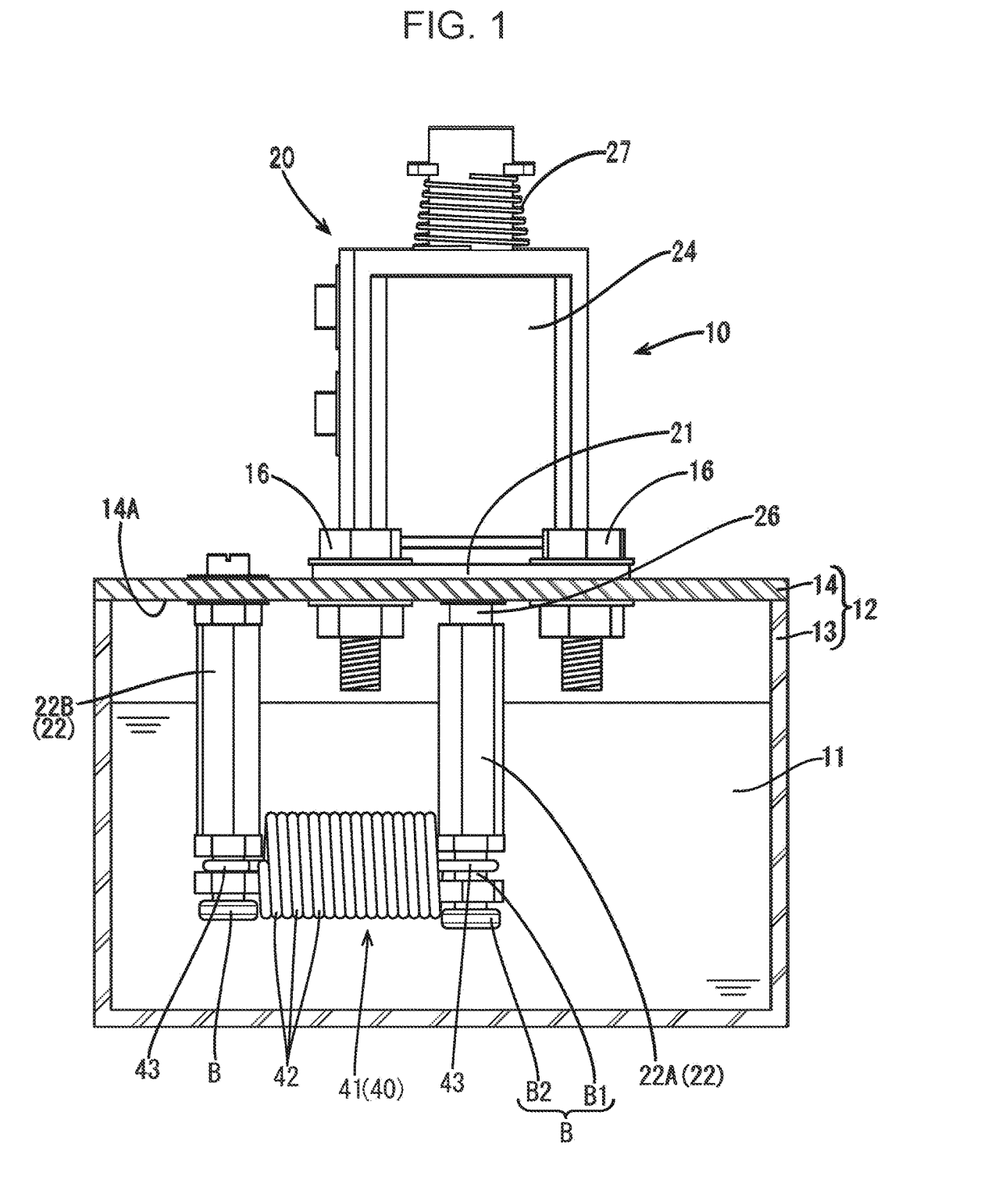
FIG. 1 is a partial cutaway cross-sectional view of a heat storage device according to a first embodiment.
Figure 2:
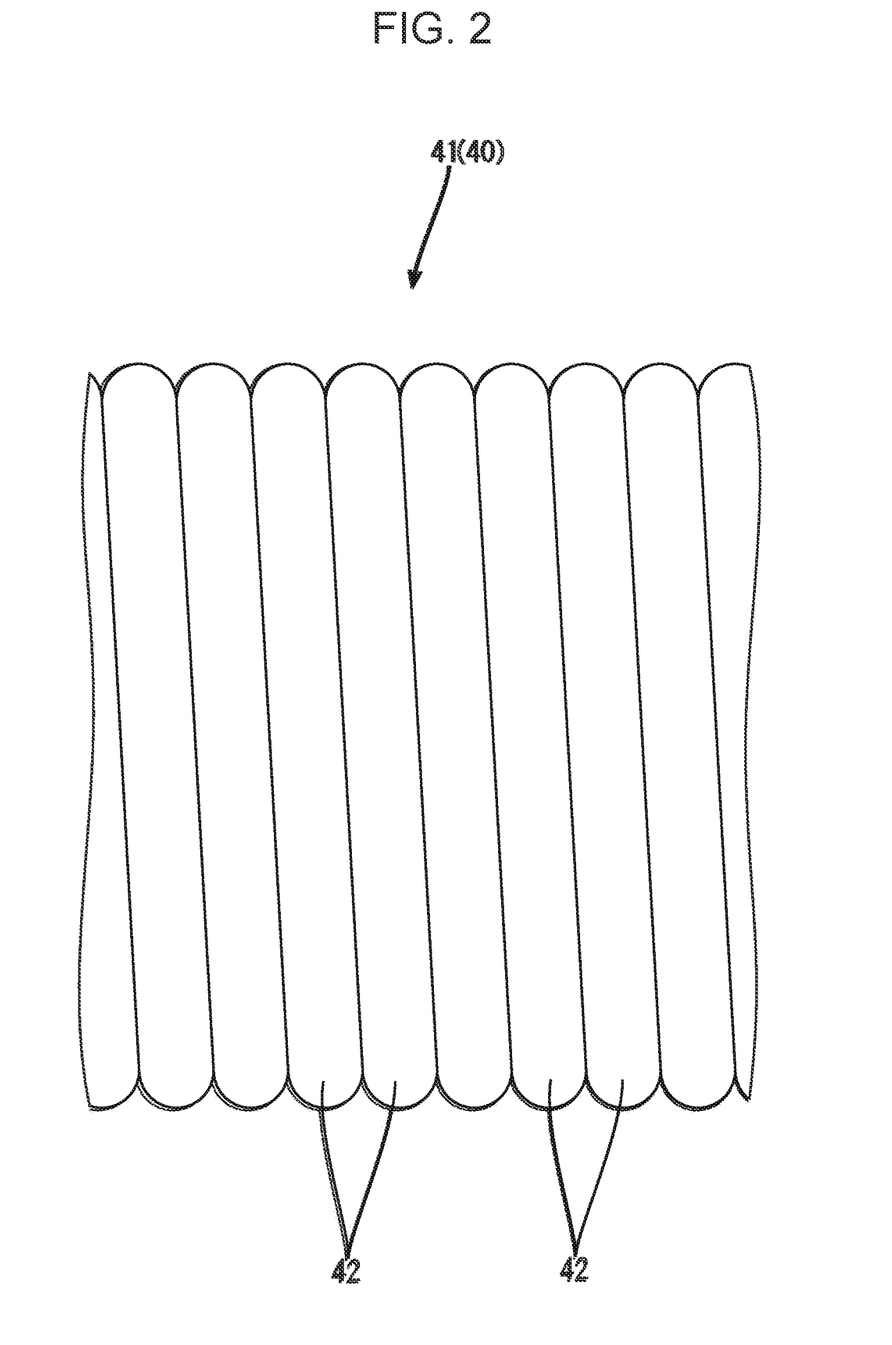
FIG. 2 is an enlarged view of a main portion of FIG. 1.
Figure 3:
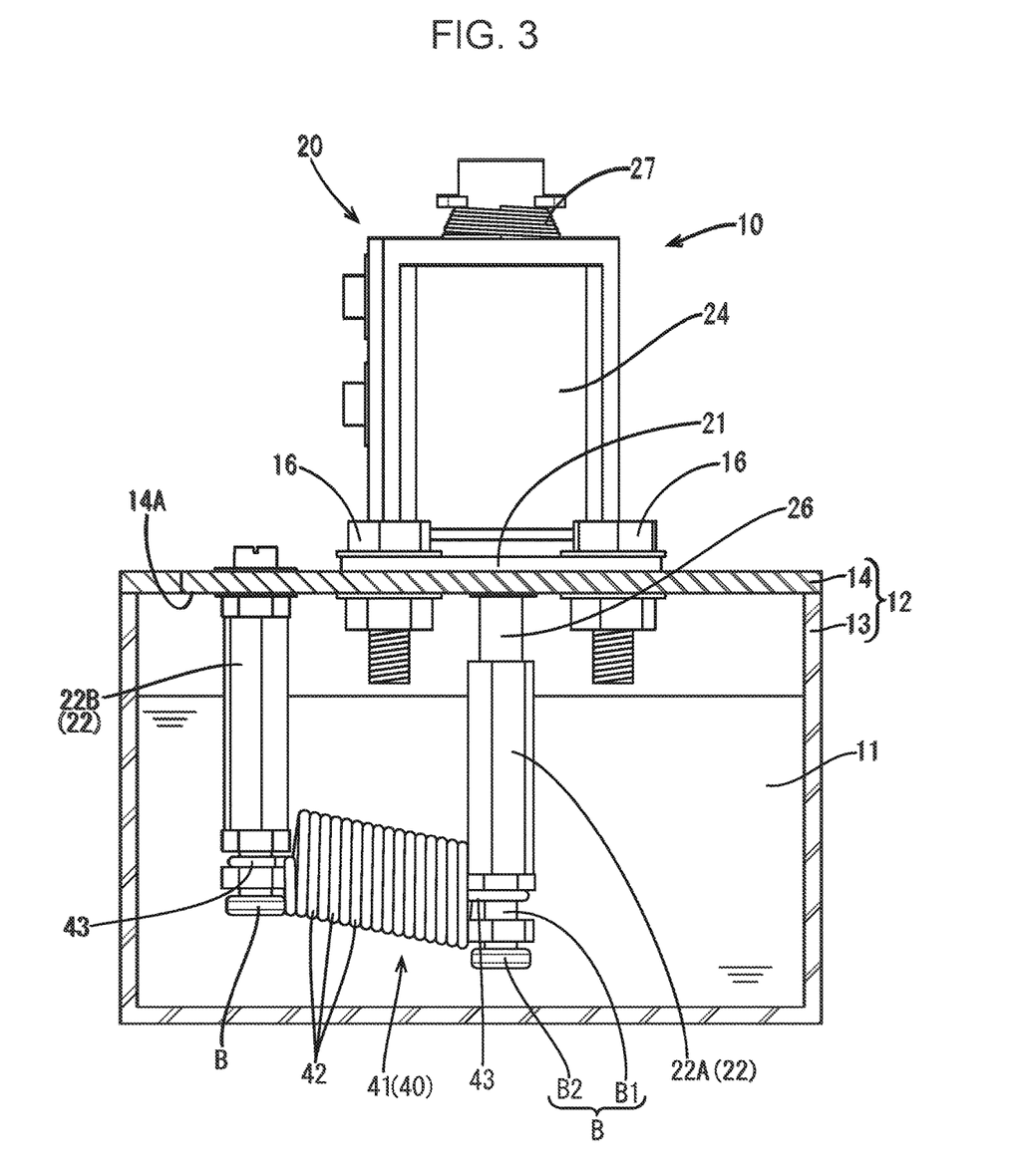
FIG. 3 is a partial cutaway cross-sectional view of a heat storage device when a moveable support portion is displaced from an initial position to a final position.

As illustrated in FIGS. 1 and 3, the heat storage device 10 includes the heat storage material 11, a housing container 12 that houses the heat storage material 11, and a nucleation device 20 fixed to the housing container 12 and disposed within the heat storage material 11.

The heat storage material 11 is made of sodium acetate trihydrate in a stabilized supercooled state, and generates heat when phase changing (from a liquid state to a solid state) from a supercooled state. Note that the heat storage material 11 may be any known heat storage material 11 that phase changes from a supercooled state.

The housing container 12 is made of a synthetic resin with thermal resistance, and as illustrated in FIGS. 1 and 3, includes a container body 13 that opens upward and a cover portion 14 that covers the upper end opening of the container body 13.

Inside the container body 13, the heat storage material 11 and the lower end portion of the nucleation device 20 are housed. The lower end portion of the nucleation device 20 is housed inside the container body 13 and disposed within the heat storage material 11.

The cover portion 14 is fixed to the container body 13 so as to cover the upper end opening of the container body 13. The cover portion 14 is formed with attachment holes (not illustrated) for attaching the nucleation device 20, the attachment holes penetrating through the cover portion 14 in the up-down direction. The cover portion 14 is fixed to the container body 13 with the nucleation device 20 attached via the attachment holes, thus sealing the heat storage material 11 inside the housing container 12.

As illustrated in FIGS. 1, 3, 5, and 7, the nucleation device 20 includes a fixing plate 21 that is fixed to the cover portion 14 of the housing container 12, a trigger unit (an example of an "elastic member") 40 disposed inside the container body 13 of the housing container 12, a pair of support portions 22 that support the trigger unit 40, and a drive unit 24, one of the pair of support portions 22 being attached to the lower end portion of the drive unit 24.

Figure 5:
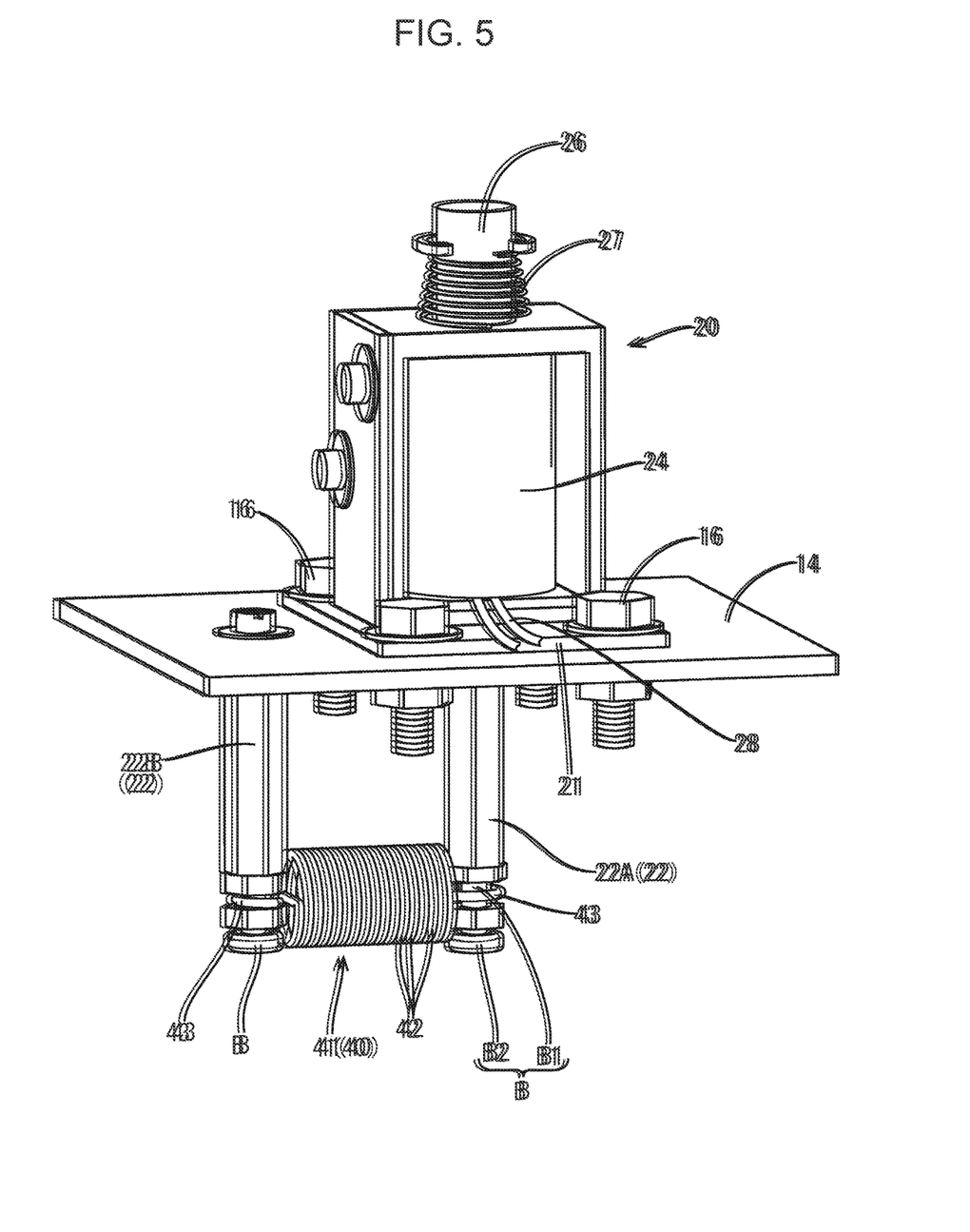
FIG. 5 is a perspective view of a nucleation device fixed on a cover portion.
Figure 6:
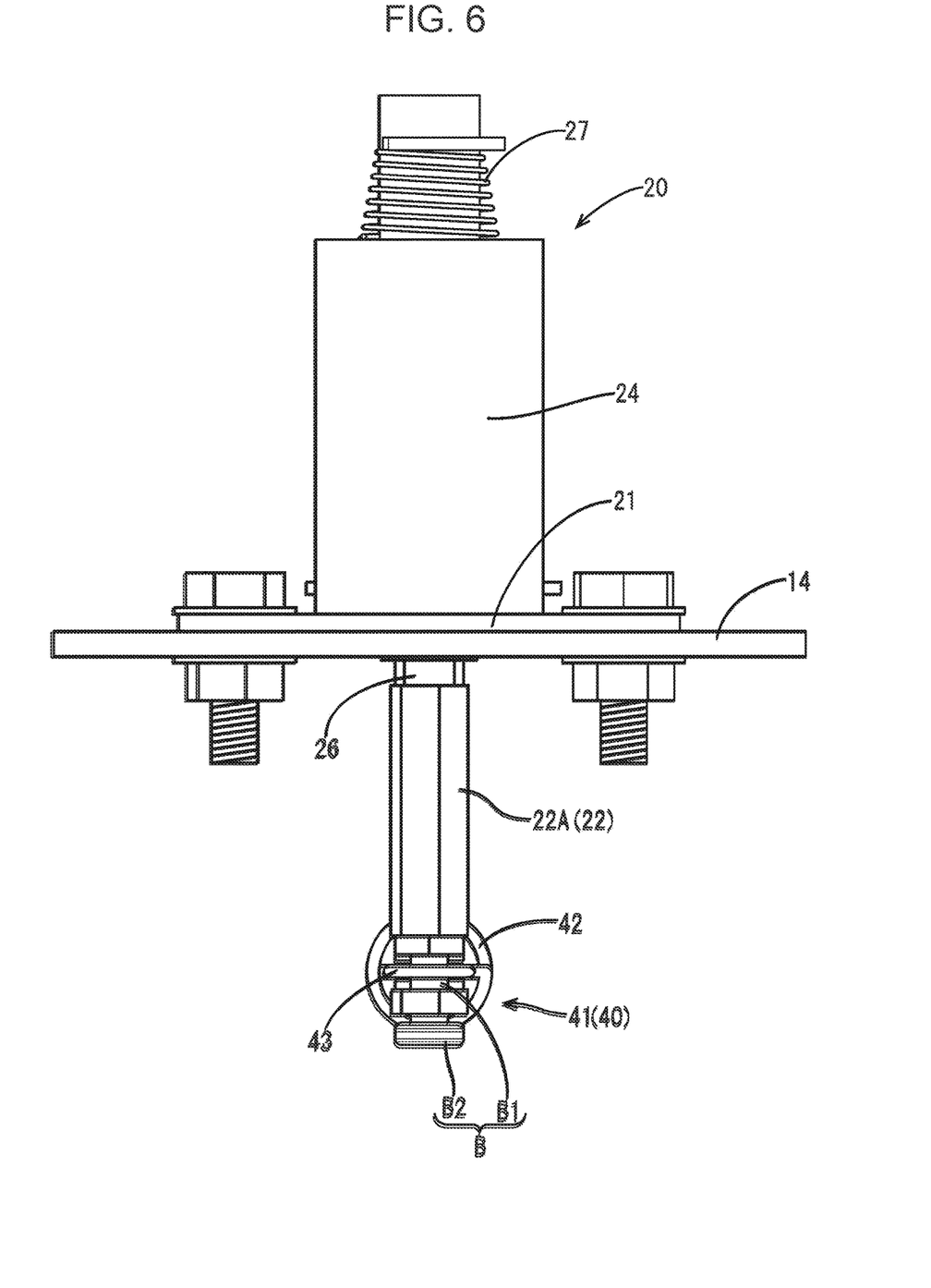
FIG. 6 is a side view of a nucleation device fixed on a cover portion.
Figure 7:
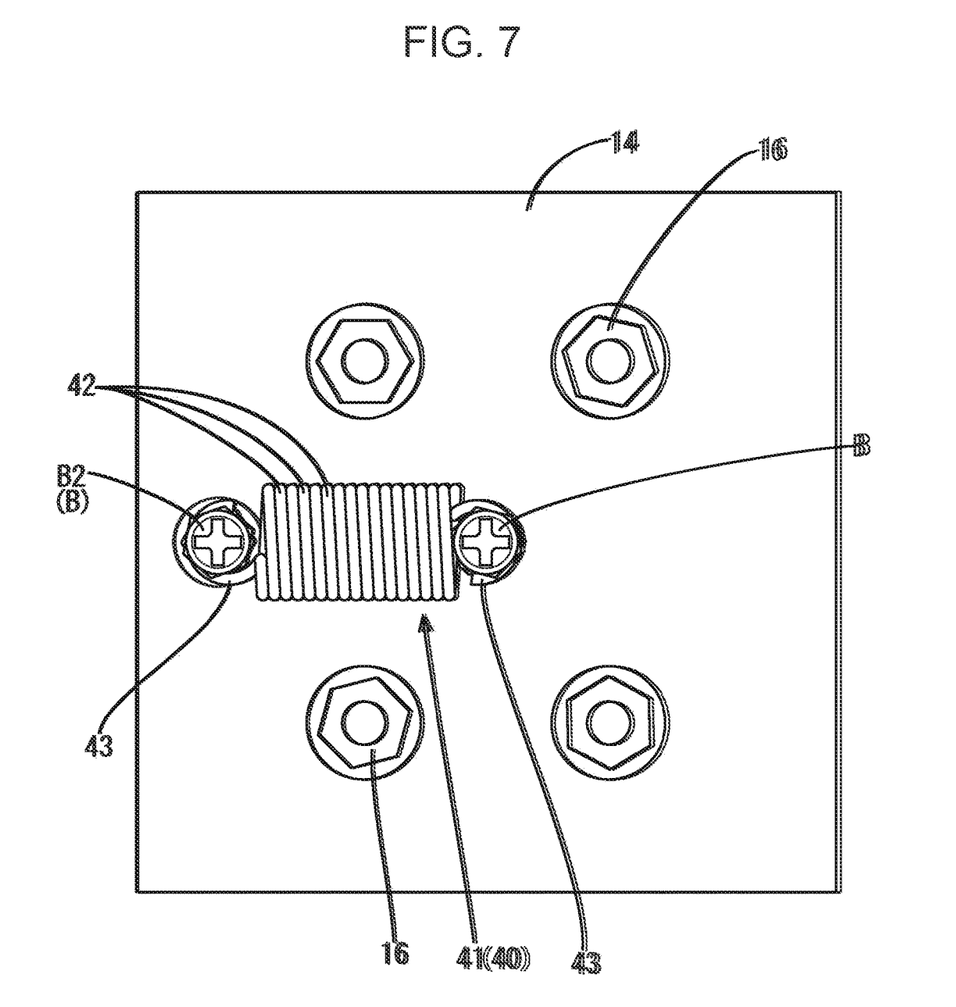
FIG. 7 is a bottom view of a nucleation device fixed on a cover portion.

The fixing plate 21 is made of metal and has a rectangular shaped plate-like shape. As illustrated in FIGS. 1 and 5, the fixing plate 21 is disposed on the upper surface of the cover portion 14 such that the attachment holes of the cover portion 14 are covered from above. The cover portion 14 and the fixing plate 21 are joined together and fixed by a plurality of fastening members 16.

The drive unit 24 is a direct acting solenoid configured to actuate in the up-down direction a plunger 26 moveable in the up-down direction. The drive unit 24 is fixed on the fixing plate 21 so that the plunger 26 penetrate to the attachment hole 21 of the fixing plate 21 and the attachment hole 21 of the cover portion in the up-down direction.

As illustrated in FIGS. 1, 3, and 5, a spring member 27 that biases the plunger 26 upward is provided on the upper end portion of the plunger 26 of the drive unit 24. As illustrated in FIG. 1, when the drive unit 24 is not energized, the plunger 26 is biased upward by the spring member 27 and held in the initial position. In FIG. 5, the drive unit 24 is energized via a lead wire 28. As illustrated in FIG. 3, when the drive unit 24 is energized and switched on, the plunger 26 moves downward to a final position, and when the drive unit 24 is switched off and unenergized, the plunger 26 is urged by the spring member 27 and returns to the initial position.

As illustrated in FIGS. 1 and 5, the pair of support portions 22 are shaped like bolts, long in the up-down direction. One of the pair of support portions 22 is fixed so as to extend downward from the lower end portion of the plunger 26 of the drive unit 24. The other support portion 22 is screwed and fixed to the cover portion 14 so as to protrude downward from a lower face 14A of the cover portion 14.

In other words, one support portion 22 of the pair of support portions 22 is a moveable support portion (an example of a "moveable portion") 22A that moves up-down direction in accordance with the up-down movement of the plunger 26, and the other support portion 22 of the pair of support portions 22 is a fixed support portion (an example of a "fixed portion") 22B that is fixed to the cover portion 14 not allowing for movement.

As illustrated in FIGS. 1 and 5, the lower end portion of each of the support portions 22 is provided with a fixing bolt B for fixing the trigger unit 40 that can be tightened from below. The fixing bolt B may be a known bolt provided with a shaft portion B1 and a head portion B2 located at one end of the shaft portion B1, the head portion B2 having a larger outer diameter than the shaft portion B1. The fixing bolt B is fixed to the lower end portion of the support portion 22 by tightening the shaft portion B1 of the fixing bolt B to the lower end portion of the support portion 22.

As illustrated in FIGS. 1, 3, 5, and 7, the trigger unit 40 is a helical extension spring that includes a coil-shaped spring body 41 constituted of a plurality of ring shaped annular portions 42 formed in a continuous spiral and a pair of gripping portions 43 provided on both end portions of the spring body 41. The helical extension spring used has a spring constant k (N/mm) represented by Formula (1) below of 0.8 or greater, and preferably 1.3 or greater, where G (N/mm$^2$) is the transverse elasticity modulus of the spring material, d (mm) is the wire diameter of the spring, Na is the number of active coils of the spring, and D (mm) is the average coil diameter of the spring.

Formula 1

$$k = Gd^4/8ND^3 \tag{1}$$

The pair of gripping portions 43 are shaped like round hooks that protrude out from both end portions of the spring body 41 in opposite directions. The shaft portions B1 of the fixing bolts B are insertable in the gripping portions 43. As illustrated in FIGS. 1 and 5, the shaft portions B1 of the fixing bolts B are inserted in the gripping portions 43 and screwed into the support portions 22 such that the gripping portions 43 are held at the lower end portion of the support portions 22. The trigger unit 40 is held substantially horizontally between the lower end portions of the pair of support portions 22.

Note that as illustrated in FIGS. 1 and 3, the gripping portion (one of the gripping portions) 43 fixed to the fixed support portion 22B is tightly fixed by the fixing bolt B so its position does not change. The gripping portion (the other gripping portion) 43 fixed to the moveable support portion 22A held allowing for movement in the up-down direction along the shaft portion B1 of the fixing bolt B by providing a space larger than the thickness of the gripping portion 43 between the moveable support portion 22A and the head portion B2 of the fixing bolt B. Thus, when the moveable support portion 22A moves downward, the movement of the moveable support portion 22A is not blocked by the trigger unit 40 getting caught between the pair of support portions 22 and the like.

The spring body 41 is formed with the plurality of annular portions 42 wound in close contact with one another. Also, as illustrated in FIG. 1, the length dimension of the spring body 41 (length dimension in the direction in which the plurality of annular portions 42 are arranged) is substantially identical to the distance between the pair of support portions 22.

Note that "close contact" corresponds to "substantially close contact" and refers to a state in which adjacent annular portions 42 are in a certain state of close contact, yet allows for vital material for the nucleation of the heat storage material 11 to be present between the adjacent annular portions 42 when viewed microscopically.

Figure 4:
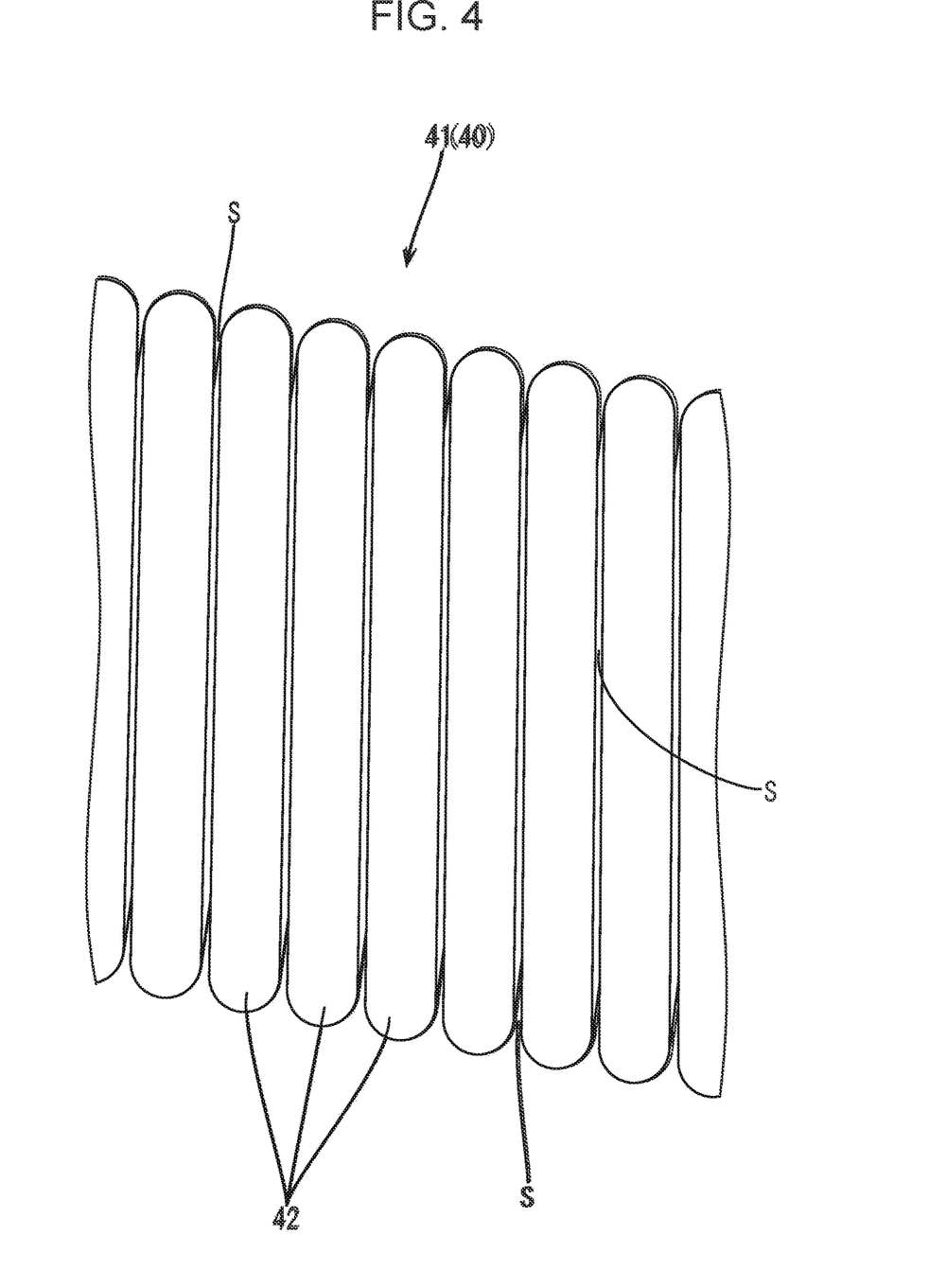
FIG. 4 is an enlarged view of a main portion of FIG. 2.

As illustrated in FIG. 3, the spring body 41 may be pulled by the pair of gripping portions 43 in the opposite direction or a diagonal direction, elastically displacing the annular portions 42. As illustrated in FIG. 4, this creates spaces S between adjacent annular portions 42 separated from one another.

Accordingly, when the plunger 26 of the drive unit 24 is in the initial position, the gripping portion 43 fixed to the moveable support portion 22A is not subjected to stress, and the spring body 41 is not elastically displaced. When the plunger 26 of the drive unit 24 is moved from the initial position downward to the final position, stress acts diagonally downward on the gripping portion 43 fixed to the moveable support portion 22A. As a result, the spring body 41 is elastically displaced, and adjacent annular portions 42 are separated from each other, creating the spaces S.

The present embodiment has the configuration described above. Next, the operations and effects of the nucleation device 20 in the heat storage device 10 will be described.

As illustrated in FIG. 1, the heat storage material 11 is housed in the housing container 12 in a liquid state, and the trigger unit 40 of the nucleation device 20 is immersed in the heat storage material 11. Then, the heat storage material 11 is cooled to the solidifying point or below and put in a supercooled state.

In actuating the heat storage device 10 to generate heat, the drive unit 24 is switched from off to on, the plunger 26 is moved from the initial position to the final position, and the moveable support portion 22A is moved downward. This makes stress act diagonally downward on the gripping portion 43 of the trigger unit 40 held at the lower end portion of the moveable support portion 22A. As illustrated in FIG. 3, this elastically displaces the spring body 41 of the trigger unit 40 by it being stretched in the diagonally downward direction. As illustrated in FIG. 4, the adjacent annular portions 42 are separated from each other and spaces S are created. This changes the adjacent annular portions 42 from a state of close contact to a state of non-close contact. As a result, the heat storage material 11, which was under close contact conditions, is nucleated. Then, solidification heat of the heat storage material 11 is released, and by the heat storage material 11 phase changing from a liquid state to a solid state, the heat storage device 10 generates heat.

As described above, according to the present embodiment, the heat storage material 11 can be nucleated by switching the device from off to on from a remote location, and simply changing the adjacent annular portions 42 of the trigger unit 40 from the state of close contact to the state of non-close contact. In other words, the nucleation reliability of the heat storage material 11 installed at a remote location can be increased with a simple configuration.

The heat storage material 11 turned to a solid state via nucleation can be returned to a liquid state via heating to the melting point or higher, then re-cooling the heat storage material 11 to a supercooled state. This allows for the heat storage material 11 to be repeatedly nucleated to release solidification heat.

Note that when the trigger unit 40 is first disposed in the heat storage material 11, or when the trigger unit 40 is cleaned, or other times when the heat storage material 11 may not penetrate into the portions of the trigger unit 40 where adjacent annular portions 42 are in close contact, by charging a powder of crystallized sodium trihydrate (seed crystals), for example, in the portions of the trigger unit 40 in close contact, the heat storage material 11 with adjacent annular portions 42 of the spring body 41 under close contact conditions can enter such portions, thus facilitating nucleation of the heat storage material 11. Additionally, the power of sodium acetate trihydrate is not required to be charged in all portions where adjacent annular portions 42 are in close contact, and the charging amount and locate of the powder of sodium acetate trihydrate can be selected as desired.

Additionally, according to the present embodiment, the portions of the trigger unit 40 in close contact with one another are all of the adjacent portions of the annular portions 42 of the spring body 41. Because these portions are continuous in a spiral manner, compared to a configuration in which only a portion of the trigger unit was in close contact, for example, when the spring body 41 elastically deforms, the nucleation reliability of the heat storage material 11 can be further increased.

Furthermore, according to the present embodiment, the trigger unit 40 is disposed in the heat storage material 11, and the heat storage material 11 can be nucleated simply by the elastically displacement of the trigger unit 40. Thus, compared to a configuration in the related art in which the heat storage material and an activator are housed in different containers and nucleation is controlled by an on/off valve, the heat storage device 10 can be simplified.

Second Embodiment

Next, a second embodiment will be described while referencing FIGS. 8 to 10.

A heat storage device 110 of the present embodiment uses solidification heat released when the heat storage material 11 phase changes from a liquid state to a solid state as a heat source.

Figure 8:
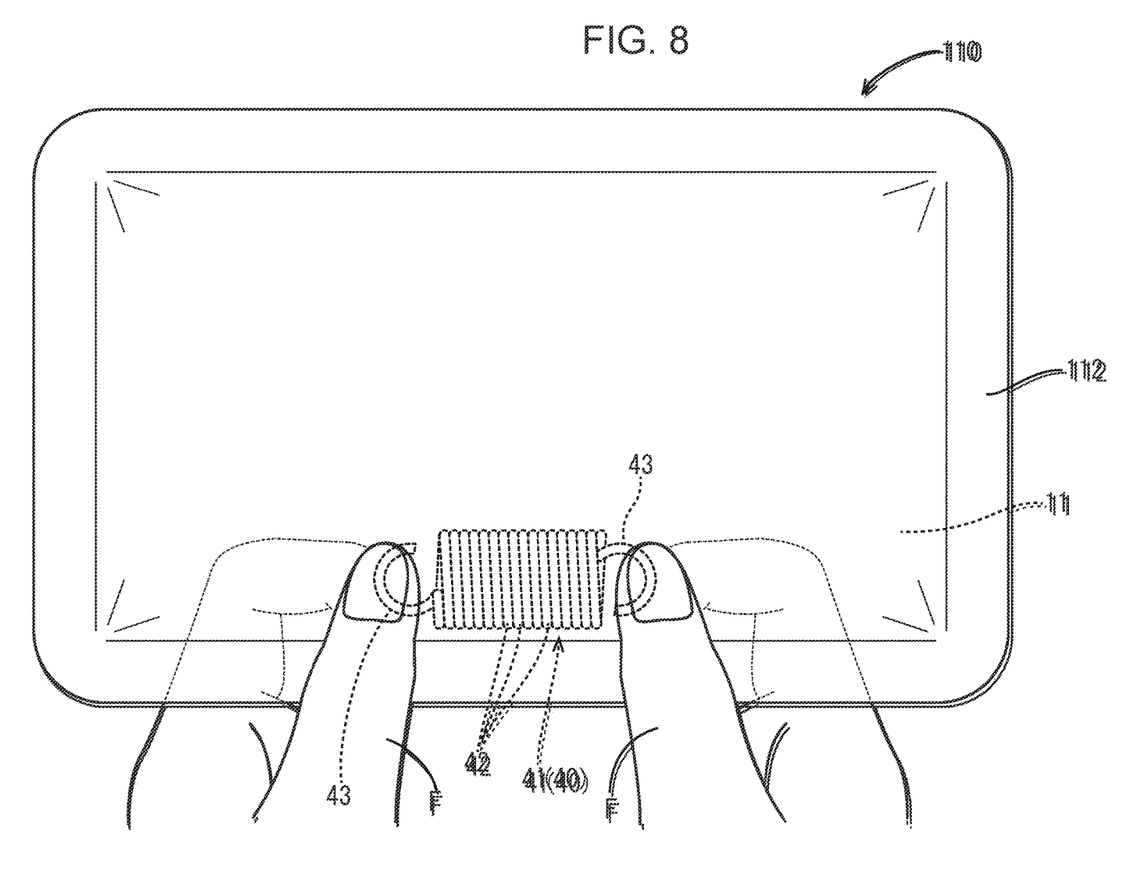
FIG. 8 is a view of a heat storage device according to a second embodiment.
Figure 9:
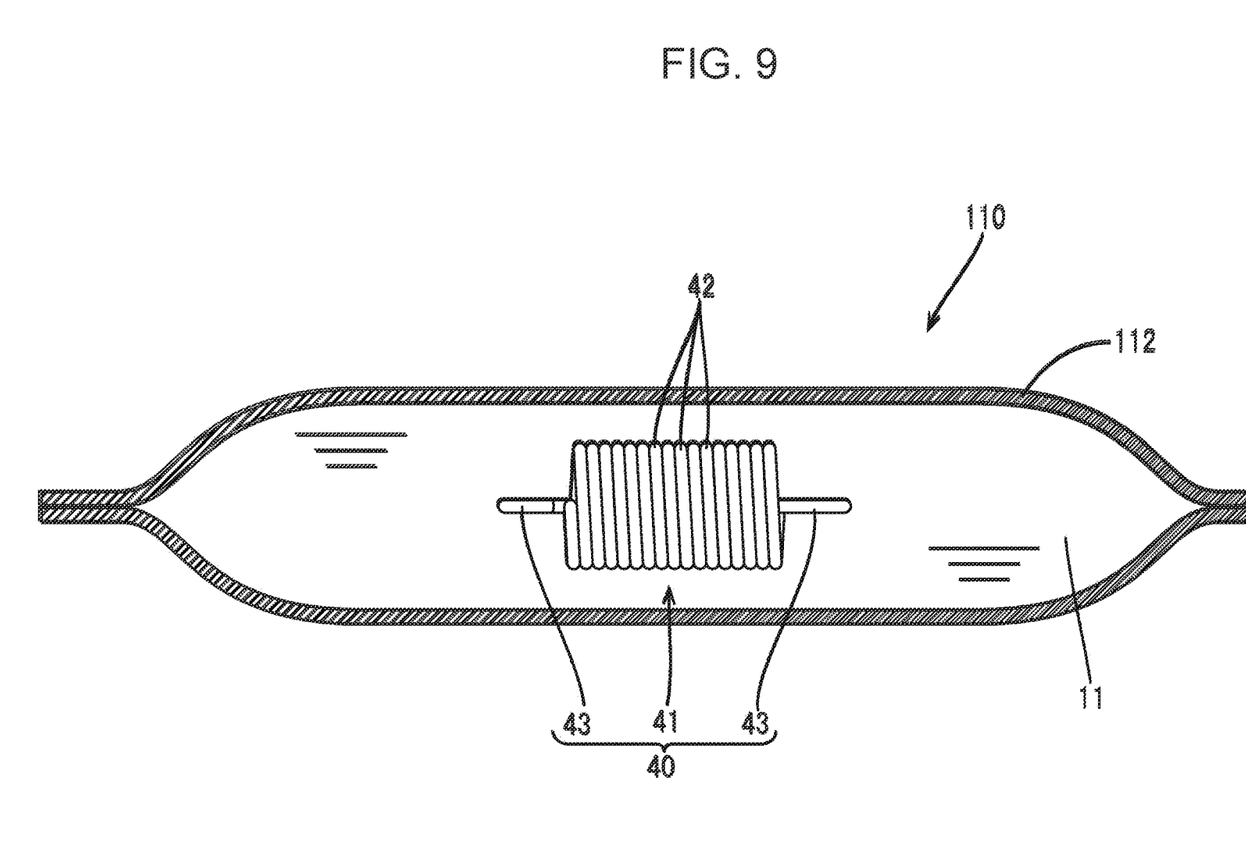
FIG. 9 is a cross-sectional view of a heat storage device.
Figure 10:
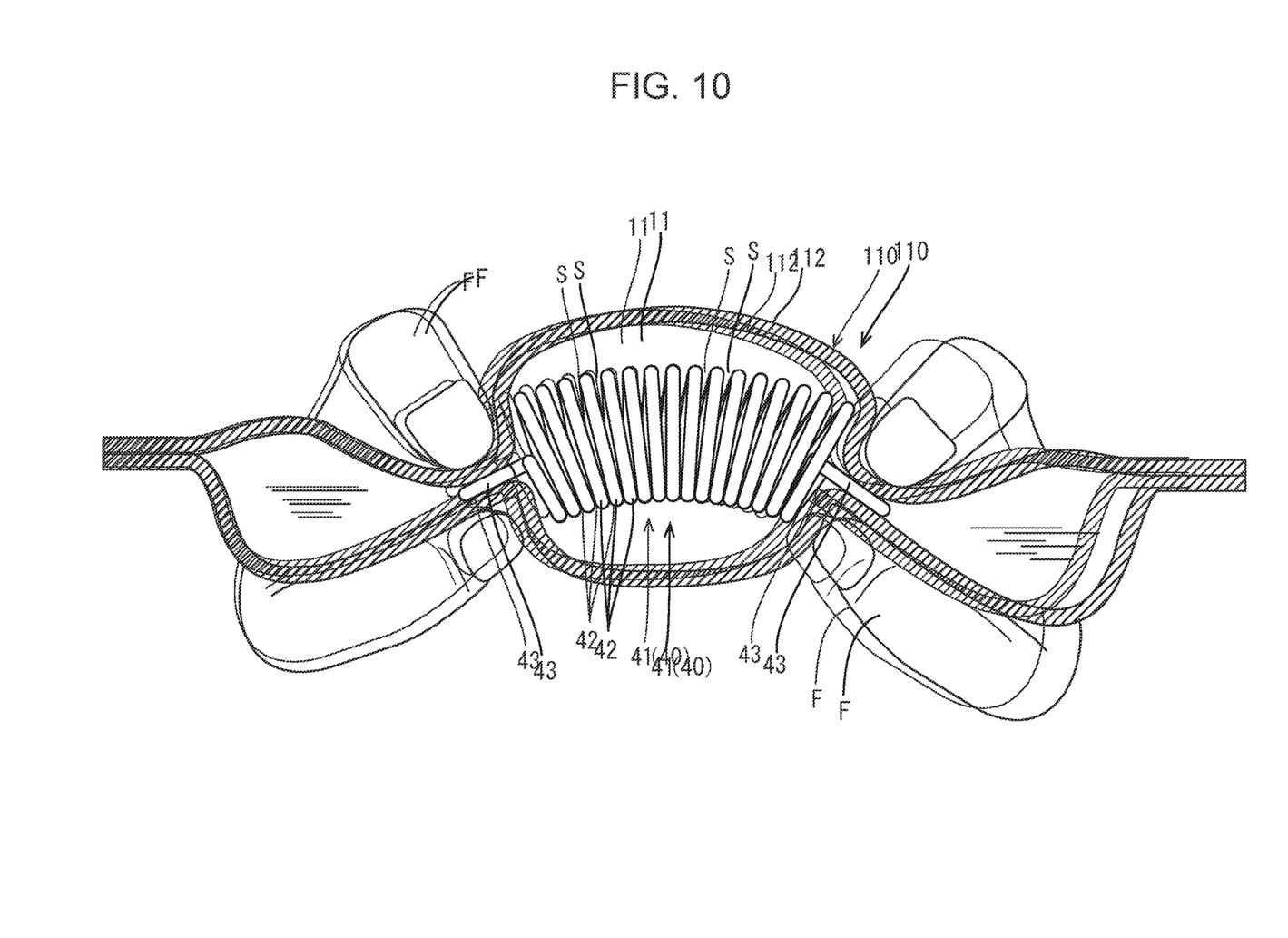
FIG. 10 is a cross-sectional view of an elastically displaced trigger unit of the heat storage device, and corresponds to cross-sectional view of the heat storage device of FIG. 9.

As illustrated in FIGS. 8 to 10, the heat storage device 110 includes the heat storage material 11, a housing pack (an example of a "container") 112 that houses the heat storage material 11, and the trigger unit (an example of an "elastic member") 40 housed in the housing pack 112 and disposed in the heat storage material 11. Note that in the present embodiment, the trigger unit 40 corresponds to a nucleation device.

The heat storage material 11 has the same configuration as the heat storage material 11 of the first embodiment and generates heat when phase changing (from a liquid state to a solid state) from a supercooled state. Note that the heat storage material 11 may be any known heat storage material that phase changes from a supercooled state.

The housing pack 112 is a pack-shaped container including an outer material made of a flexible synthetic resin, with the outer periphery portion heat sealed. The housing pack 112 is deformable by stress from outside such as a pressing force, and stress from outside can be easily transmitted to the trigger unit 40 housed inside the housing pack 112.

The trigger unit 40 has a similar configuration to the trigger unit 40 of the first embodiment, and for example, when the pair of gripping portions 43 of the trigger unit 40 are pinched by fingers F from the outside of the housing pack 112 and stress from outside is applied, the spring body 41 can be elastically displaced.

In other words, according to the present embodiment, the heat storage material 11 housed in the housing pack 112 is put in a supercooled state, the pair of gripping portions 43 of the trigger unit 40 are pinched by fingers F from the outside of the housing pack 112, and the spring body 41 is bent and elastically deformed. As a result, adjacent annular portions 42 are changed from a state of close contact to a state of non-close contact, and the heat storage material 11 under the close contact conditions can be nucleated. Thus, solidification heat of the heat storage material 11 is released and the heat storage material 11 phase changes from a liquid state to a solid state, allowing the heat storage device 110 to generate heat.

EXAMPLES

The heat storage device 10, 110 according to the first and second embodiments were tested to see if the heat storage material 11 phase changed from a liquid state to a solid state.

Nucleation Test

This test was carried out on the heat storage device 110 of the second embodiment. In this test, the housing pack 112 of the second embodiment was cooled and the heat storage material 11 was put in a supercooled state.

Next, the pair of gripping portions 43 of the trigger unit 40 were pinched by fingers F from the outside of the housing pack 112, and the spring body 41 was bent and elastically deformed such that adjacent annular portions 42 separated from one another.

The trigger unit 40 used was as follows.

TABLE 1

| Sample No. | Wire diameter d (mm) | Outer diameter D (mm) | Number of active coils N | Spring constant k (N/mm) | Initial tension Pi (N) | Manufacturer | Product number |
|---|---|---|---|---|---|---|---|
| Example 1 | 0.9 | 6.0 | 16 | 2.650 | 5.84 | SHINSEI HATSUJHO CO., LTD. | S-060-01 |
| Example 2 | 1.0 | 8.0 | 15 | 1.660 | 4.99 | Yahata Neji Co., Ltd. | E661 |
| Example 3 | 1.0 | 8.0 | 11.5 | 2.170 | 4.99 | MiSUMi-VONA | 22-0850 |
| Example 4 | 1.0 | 8.0 | 16.5 | 1.510 | 4.99 | MiSUMi-VONA | 22-0851 |
| Example 5 | 1.2 | 12.0 | 9.5 | 1.342 | 3.98 | MiSUMi-VONA | UFSP12-1.2-12 |
| Example 6 | 1.4 | 12.0 | 9.5 | 2.630 | 7.55 | MiSUMi-VONA | UFSP12-1.4-14 |
| Example 7 | 1.6 | 12.0 | 9.5 | 4.751 | 12.21 | MiSUMi-VONA | UFSP12-1.6-16 |

TABLE 1-continued

| Sample No. | Wire diameter d (mm) | Outer diameter D (mm) | Number of active coils N | Spring constant k (N/mm) | Initial tension Pi (N) | Manufacturer | Product number |
|---|---|---|---|---|---|---|---|
| Example 8 | 1.4 | 12.0 | 16.5 | 1.493 | 7.55 | MiSUMi-VONA | UFSP12-1.4-25 |
| Example 9 | 1.4 | 12.0 | 25.5 | 1.042 | 7.55 | MiSUMi-VONA | UFSP12-1.4-37 |
| Example 10 | 1.4 | 12.0 | 33.5 | 0.801 | 7.55 | MiSUMi-VONA | UFSP12-1.4-48 |
| Example 11 | 1.4 | 10.0 | 9.5 | 4.925 | 10.70 | MiSUMi-VONA | UFSP10-1.4-14 |
| Example 12 | 1.4 | 14.0 | 9.5 | 1.566 | 5.35 | MiSUMi-VONA | UFSP14-1.4-14 |
| Example 13 | 1.4 | 16.0 | 9.5 | 1.007 | 4.26 | MiSUMi-VONA | UFSP16-1.4-14 |
| Comparative Example 1 | 0.6 | 5.0 | 62 | 0.210 | 1.65 | Accurate Inc. | E644 |
| Comparative Example 2 | 0.65 | 6.3 | 63 | 0.130 | 1.41 | Accurate Inc. | E640 |
| Comparative Example 3 | 0.8 | 10.0 | 24 | 0.190 | 1.20 | Yahata Neji Co., Ltd. | E646 |
| Comparative Example 4 | 1.0 | 12.0 | 9.5 | 0.613 | 1.65 | MiSUMi-VONA | UFSP12-1.0-10 |

Results and Observations

The nucleation test was carried out from three to eight times on the trigger units 40. The results are shown below. Note that the test results are the results for test carried out on the second embodiment. However, tests on the heat storage device 10 of the first embodiment using the trigger units 40 described above would give similar results.

TABLE 2

| Sample No. | Number of tests | Times nucleation was observed | Success rate (%) |
|---|---|---|---|
| Example 1 | 7 | 7 | 100 |
| Example 2 | 7 | 7 | 100 |
| Example 3 | 3 | 3 | 100 |
| Example 4 | 3 | 3 | 100 |
| Example 5 | 8 | 8 | 100 |
| Example 6 | 8 | 8 | 100 |
| Example 7 | 5 | 5 | 100 |
| Example 8 | 8 | 8 | 100 |
| Example 9 | 8 | 6 | 75 |
| Example 10 | 8 | 5 | 62.5 |
| Example 11 | 8 | 8 | 100 |
| Example 12 | 8 | 8 | 100 |
| Example 13 | 8 | 8 | 100 |
| Comparative Example 1 | 6 | 0 | 0 |
| Comparative Example 2 | 6 | 0 | 0 |
| Comparative Example 3 | 7 | 0 | 0 |
| Comparative Example 4 | 8 | 0 | 0 |

As can be seen from the results of Table 2, Examples 1 to 13, in which the spring constant k (N/mm) of the trigger unit 40 is 0.8 or greater, have a nucleation success rate of 62% or greater. Examples 1 to 8, 11, and 12, in which the spring constant k (N/mm) of the trigger unit 40 is 1.3 or greater, have a nucleation success rate of 100%.

Comparative Examples 1 to 4, in which the spring constant k (N/mm) is from 0.2 to less than 0.65, have a nucleation success rate of 0%.

In other words, it is considered that when the spring constant k (N/mm) of the trigger unit 40 is high at 0.8 or greater, and preferably at 1.3 or greater, the pressure under the close contact conditions increases, and the vital material under the close contact conditions of adjacent annular portions 42 are more likely to remain. Then, when adjacent annular portions 42 change from a state of close contact to a state of non-close contact with vital material in the portions of the annular portions 42 in a close contact state, the vital material (for example, seed crystals) under close contact conditions come into contact with the heat storage material 11 in a liquid state and the heat storage material 11 nucleates.

Additionally, initial tension Pi (N) can be found with Formula (2) below, where for the helical extension spring used, G (N/mm$^2$) is the transverse elasticity modulus of the spring material, d (mm) is the wire diameter of the spring, and D (mm) is the average coil diameter of the spring. The initial tension Pi (N) of Examples 3 to 13, which have a nucleation success rate of 62% or greater, is 3.9 or greater. The initial tension Pi (N) of Comparative Example 4, which has a nucleation success rate of 0%, is 1.65.

[Formula 2]

$$Pi = Gd^4 / 255D^2 \qquad (2)$$

Accordingly, it is considered that when the initial tension is 3.9 or less, the nucleation success rate of the heat storage material 11 is reduced.

Other Embodiments

The technology disclosed in the present specification is not limited to the preceding recitations and/or the embodiments described using the drawings, and various aspects such as the following should be construed to be included.

(1) The first embodiment described above has a configuration in which the moveable support portion 22A is moved downward from the initial position to the final position. However, this is not intended as a limitation, and the moveable support portion may move in the horizontal direction and the spring body may elastically displace in the horizontal direction.

(2) The first embodiment described above has a configuration in which the trigger unit 40 is disposed horizontally. However, this is not intended as a limitation, and the trigger unit may be disposed vertically (in the up-down direction).

(3) In the first embodiment described above, the drive unit 24 is a constituted by a solenoid. However, this is not intended as a limitation, and the drive unit may be configured to drive via a motor or a compressor.

(4) In the first embodiment described above, the housing container 12 is a constituted by a synthetic resin. However, this is not intended as a limitation, and the housing container may be constituted by a metal such as stainless steel (SUS), aluminum, and the like.

(5) The second embodiment described above has a configuration in which the spring body 41 is elastically displaced by the pair of gripping portions 43 of the trigger unit

40 being pinched by fingers F. However, this is not intended as a limitation, and the spring body of the trigger unit may be elastically displaced by the spring body being pinched by fingers, or the spring body may be pressed and elastically displaced by an actuator from outside.

(6) The first and second embodiments described above have a configuration in which a helical extension spring is used as the trigger unit 40. However, this is not intended as a limitation, and a spring body including a plurality of annular portions in close contact with one another and a torsion spring (also referred to as a "kick spring") including a pair of arms extending in a straight light in the tangential direction of the annular portions from both ends of the spring body may be used as the trigger unit.

What is claimed is:

1. A nucleation device configured to cause phase change in a heat storage material from a liquid state to a solid state, the nucleation device comprising:
   an elastic member including a spring body comprising a plurality of ring shaped annular portions formed in a continuous spiral in substantially close contact with one another and a gripping portion provided at end portions of the spring body,
   wherein the gripping portion is configured to be subjected to stress to elastically displace the spring body from a state of not being elastically displaced to a state of being elastically displaced such that adjacent pairs of the plurality of ring shaped annular portions in substantially close contact with one another separate from one another, and
   wherein the heat storage material is caused to phase change by the elastic member elastically displacing while disposed in the heat storage material.

2. The nucleation device according to claim 1, wherein the spring body is a helical extension spring.

3. The nucleation device according to claim 2, wherein the helical extension spring has a spring constant of 0.8 or greater.

4. A heat storage device comprising:
   a heat storage material that phase changes from a liquid state to a solid state;
   the nucleation device according to claim 1; and
   a container that houses the heat storage material and the nucleation device.

5. A heat storage device comprising:
   a heat storage material that phase changes from a liquid state to a solid state;
   the nucleation device according to claim 2; and
   a container that houses the heat storage material and the nucleation device.

6. A heat storage device comprising:
   a heat storage material that phase changes from a liquid state to a solid state;
   the nucleation device according to claim 3; and
   a container that houses the heat storage material and the nucleation device.

7. The heat storage device according to claim 4, wherein
   the gripping portion comprises a pair of gripping portions each having a hook shape, the pair of gripping portions being provided on the end portions of the spring body, and
   the heat storage device further comprises:
      a fixed portion fixed such that one gripping portion of the pair of gripping portions does not move;
      a moveable portion moveable between an initial position and a final position while holding another gripping portion of the pair of gripping portions, upon the moveable portion moving from the initial position to the final position, the spring body being displaced from the state of not being elastically displaced to the state of being elastically displaced; and
      a drive unit configured to press and move the moveable portion from the initial position to the final position.

8. The heat storage device according to claim 5, wherein
   the gripping portion comprises a pair of gripping portions each having a hook shape, the pair of gripping portions being provided on the end portions of the spring body, and
   the heat storage device further comprises:
      a fixed portion fixed such that one gripping portion of the pair of gripping portions does not move;
      a moveable portion moveable between an initial position and a final position while holding another gripping portion of the pair of gripping portions, upon the moveable portion moving from the initial position to the final position, the spring body being displaced from the state of not being elastically displaced to the state of being elastically displaced; and
      a drive unit configured to press and move the moveable portion from the initial position to the final position.

9. The heat storage device according to claim 6, wherein
   the gripping portion comprises a pair of gripping portions each having a hook shape, the pair of gripping portions being provided on the end portions of the spring body, and
   the heat storage device further comprises:
      a fixed portion fixed such that one gripping portion of the pair of gripping portions does not move;
      a moveable portion moveable between an initial position and a final position while holding another gripping portion of the pair of gripping portions, upon the moveable portion moving from the initial position to the final position, the spring body being displaced from the state of not being elastically displaced to the state of being elastically displaced; and
      a drive unit configured to press and move the moveable portion from the initial position to the final position.

10. A nucleation method for a heat storage material, the nucleation method comprising:
    disposing an elastic member in a heat storage material, the elastic member including a spring body comprising a plurality of ring shaped annular portions formed in a continuous spiral in substantially close contact with one another and a gripping portion provided at end portions of the spring body; and
    subjecting the gripping portion to stress to elastically displace the spring body from a state of not being elastically displaced to a state of being elastically displaced such that adjacent pairs of the plurality of ring shaped annular portions in substantially close contact with one another separate from one another and cause nucleation of the heat storage material.

11. The heat storage device according to claim 1, further comprising a moveable portion fixed to the gripping portion, wherein the moveable portion moves to displace the spring body from the state of not being elastically displaced to the state of being elastically displaced.

12. The nucleation method according to claim 10, wherein the subjecting of the gripping portion to stress comprises moving a moveable portion fixed to the gripping portion to displace the spring body from the state of not being elastically displaced to the state of being elastically displaced.

13. A heat storage device comprising:
- a heat storage material that phase changes from a liquid state to a solid state;
- a nucleation device configured to cause phase change in the heat storage material from a liquid state to a solid state;
- a container that houses the heat storage material and the nucleation device;
- a fixed portion;
- a moveable portion; and
- a drive unit,
- wherein the nucleation device comprises:
  - an elastic member comprising a spring body that comprises a plurality of annular portions continuous in a spiral manner with a ring shape wound in substantially close contact with one another; and
  - a pair of gripping portions having a hook shape and being provided on both end portions of the spring body,
- wherein the elastic member is elastically displaceable such that adjacent pairs of the plurality of annular portions in substantially close contact with one another separate from one another,
- wherein the heat storage material is caused to phase change by the elastic member elastically displacing while disposed in the heat storage material,
- wherein the fixed portion is fixed such that one gripping portion of the pair of gripping portions does not move,
- wherein the moveable portion is moveable between an initial position and a final position while holding another gripping portion of the pair of gripping portions, and upon the moveable portion moving from the initial position to the final position, the elastic member being displaced from a state of not being elastically displaced to a state of being elastically displaced, and
- wherein the drive unit is configured to press and move the moveable portion from the initial position to the final position.

14. The heat storage device according to claim 13, wherein the elastic member is a helical extension spring comprising the spring body that comprises the plurality of annular portions continuous in the spiral manner.

15. The heat storage device according to claim 14, wherein the helical extension spring has a spring constant of 0.8 or greater.

* * * * *